(12) United States Patent
O'Neill et al.

(10) Patent No.: US 6,167,976 B1
(45) Date of Patent: Jan. 2, 2001

(54) ENGINE ENCLOSURE

(75) Inventors: Michael Jerome O'Neill, Mayville; Michael Dennis Peters, West Bend, both of WI (US)

(73) Assignee: Deere & Company, Moline, IL (US)

( * ) Notice: Under 35 U.S.C. 154(b), the term of this patent shall be extended for 0 days.

(21) Appl. No.: 09/126,098

(22) Filed: Jul. 30, 1998

(51) Int. Cl.[7] .................................................. B62D 25/10
(52) U.S. Cl. ...................... 180/69.2; 180/68.1; 180/68.2; 60/316; 60/320; 123/41.49; 123/41.56
(58) Field of Search ................................. 180/68.1, 68.2, 180/68.3, 68.4, 69.2, 69.24, 69.6; 60/316, 320; 123/41.49, 41.56

(56) References Cited

U.S. PATENT DOCUMENTS

| | | | |
|---|---|---|---|
| 3,866,580 | * 2/1975 | Whitehurst et al. | 123/41.7 |
| 3,987,766 | 10/1976 | Welck | 123/41.66 |
| 4,081,050 | * 3/1978 | Hennessey et al. | 180/68.1 X |
| 4,382,481 | * 5/1983 | Moore | 123/41.49 X |
| 4,432,309 | 2/1984 | Hutchison et al. | 123/41.66 |
| 4,606,422 | * 8/1986 | Jewett | 180/68.1 |
| 4,776,417 | * 10/1988 | Takeuchi et al. | 180/68.4 |
| 4,862,981 | 9/1989 | Fujikawa et al. | 180/68.4 |
| 5,022,479 | * 6/1991 | Kiser et al. | 180/68.3 |
| 5,036,931 | * 8/1991 | Iritani | 180/68.1 |
| 5,193,636 | 3/1993 | Holm | 180/68.1 |
| 5,215,157 | 6/1993 | Teich | 180/69.24 |
| 5,618,323 | * 4/1997 | Shearn et al. | 180/68.3 X |
| 5,678,648 | * 10/1997 | Imanishi et al. | 180/68.1 |
| 5,689,953 | * 11/1997 | Yamashita et al. | 180/68.1 |
| 5,960,899 | * 2/1999 | Roach | 180/68.4 |

* cited by examiner

*Primary Examiner*—Lanna Mai
*Assistant Examiner*—Toan To

(57) ABSTRACT

A modular engine enclosure comprised of a hood and baffle is provided to channel cooling air along passages formed between their adjacent surfaces to the radiator of a water cooled engine. The passages provide acoustic air barriers and along with selected enclosure surfaces covered with sound absorbing foam, serve to contain engine sounds within the enclosure. The passages receive air from a generally upright inlet opening and direct it evenly over the top surface of the horizontally oriented radiator. After being drawn through the radiator, the air is exhausted generally horizontally out the back of the engine compartment. The modular construction of the enclosure allows it to be easily raised and/or removed so that maintenance and service activities can be performed on the engine and its components.

31 Claims, 8 Drawing Sheets

US 6,167,976 B1

ENGINE ENCLOSURE

BACKGROUND OF THE INVENTION

1. Field of the Invention

The present invention relates to vehicles having liquid cooled engines, and more specifically to an engine enclosure which is adapted to direct cooling air to and through the radiator while also serving to contain noise emitted by the engine.

2. Description of the Related Art

Vehicles such as lawn tractors commonly utilize liquid cooled gas or diesel engines with air cooled radiators. Since these vehicles are often used in cutting grass and other vegetation, the air used to cool the radiator is frequently contaminated with dust, grass clippings and similar debris. A further problem can occur when the cooling air is drawn in and around the engine. This air can become heated by the engine and cooling of the radiator can become more difficult. When ducting structures are used to keep the air cool by guiding it around the engine and to the radiator, they can interfere with access to engine components for service and/or maintenance.

It would, therefore, be desirable to provide an engine enclosure for a liquid cooled engine which can provide a sufficient supply of air to cool the radiator and engine coolant circulating through it. It would also be desirable to provide the supply of air without the flow being interrupted or compromised due to blockages caused by dust, grass clippings or similar debris. It would further be desirable to prevent the air supply from being heated by the engine as it is drawn to and passed through the radiator. Also, it would be desirable that the air heated by passing through the radiator be exhausted in a manner that would not affect the operator or lawn being cut. It would be desirable as well to provide an air intake structure that would not interfere with servicing and/or maintenance of the engine and its components. Lastly, it would be desirable to provide an air intake structure that would serve to minimize the engine noise escaping from the engine compartment.

SUMMARY OF THE INVENTION

Towards these ends, there is provided an engine enclosure module which directs air from an inlet opening to the radiator of a liquid cooled engine. The module is comprised of a hood and baffle joined together to provide air passages between their adjacent surfaces. The air inlet is sized to provide a low flow rate that will minimize the buildup of dust, grass clippings and similar debris on the inlet screen. The inlet is located behind the operator station and substantially above the ground to reduce its exposure to dust and debris and it is positioned in a generally vertical orientation to minimize the entry of rain, leaves and/or related debris. Through locating the inlet opening adjacent to the operator station, any blockages can quickly be observed and the operator can brush any buildup from the screen without leaving the operator station.

The air passages between the surfaces of the hood and baffle structure separate the air from the engine as it is directed to the radiator. Air warmed after passing through the radiator is then exhausted out the back of the engine enclosure, away from the operator and parallel to the lawn being cut.

The spaced apart hood and baffle surfaces form acoustic air passages between them that serve to contain the engine noise within the compartment, and the modular one piece enclosure assembly allows it to be raised or easily removed to allow access to the engine and its components for service and/or maintenance. Noise reducing acoustic form panels are provided to selected hood surfaces to further reduce the engine noise escaping from the engine compartment.

With the present invention there is provided a modular engine enclosure that provides a high volume of air for cooling the radiator of a liquid cooled engine at a low flow rate to minimize the buildup of debris on the intake screen. The enclosure further provides cool air to the radiator, exhausts the used air out the back of the engine compartment and away from the operator, minimizes engine noise escaping from the engine compartment and permits quick, easy and unobstructed access to the engine compartment and its components.

DESCRIPTION OF THE PREFERRED EMBODIMENT

Figure 1:
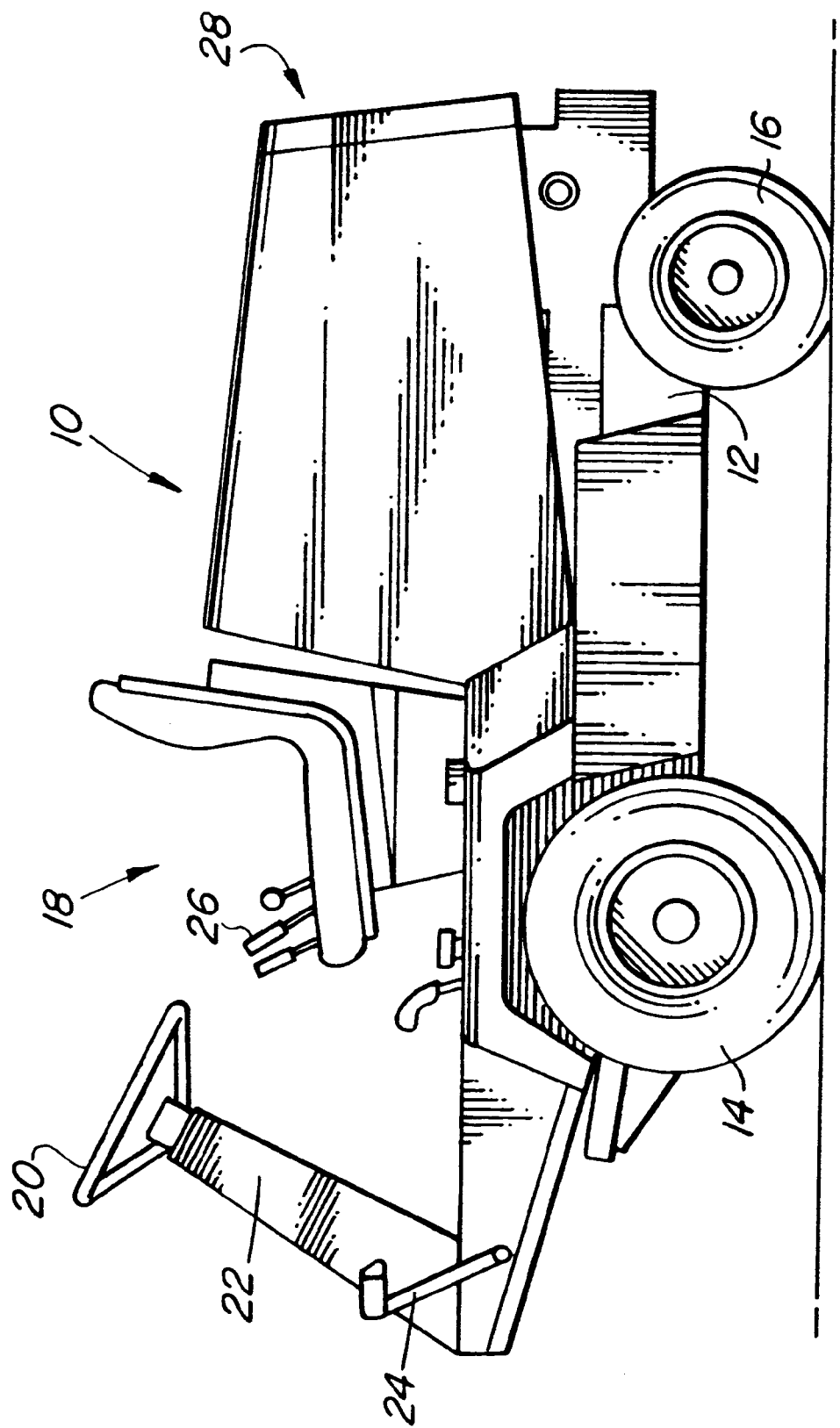
FIG. 1 is a left side view of a vehicle of the type upon which the present invention could be utilized.

Looking first to FIG. 1, there is illustrated a commercial mowing vehicle 10 upon which the present invention could be utilized. The vehicle 10 includes a frame 12 supported on front and rear wheels 14–16, and has an operator station 18 at its forward end. A steering wheel 20 is supported on an upstanding pedestal 22 and foot and hand controls 24–26 are provided for operating the vehicle 10. At the rear of the vehicle 10 is carried an engine which is housed within an engine enclosure 28.

Figure 2:
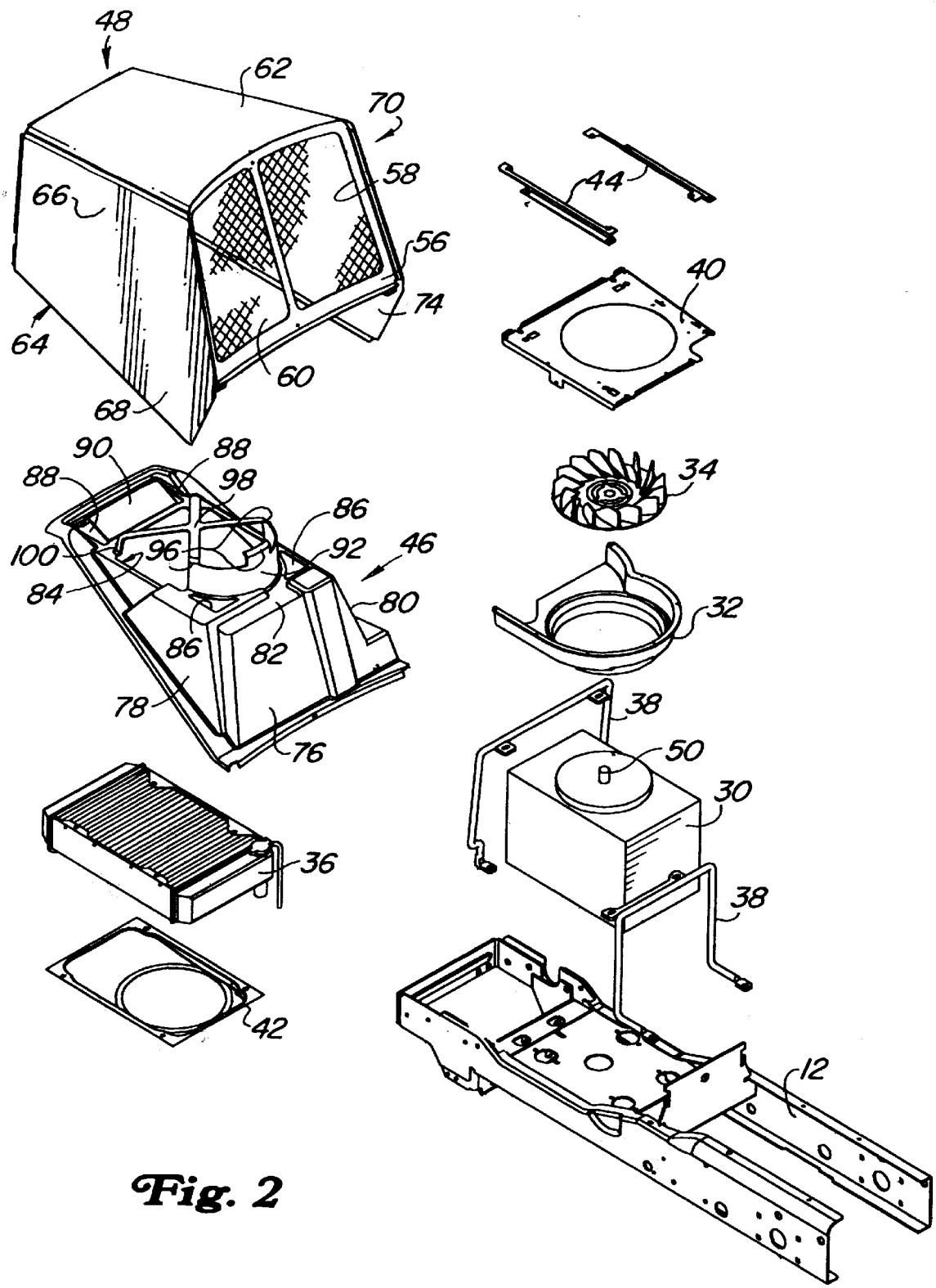
FIG. 2 is an exploded schematic view of the engine hood, baffle, radiator and major components contained within the enclosure.
Figure 3:
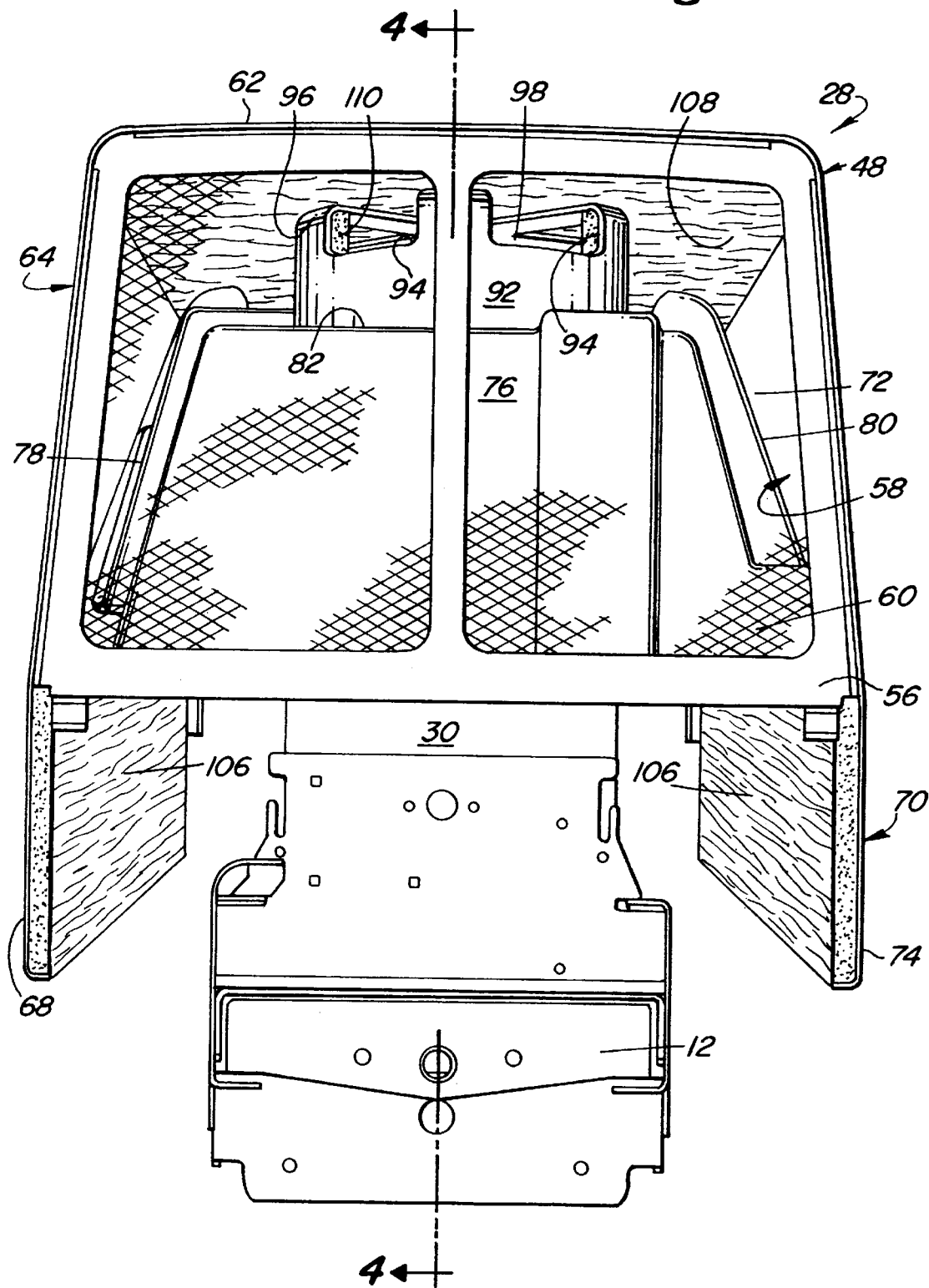
FIG. 3 is a front view of the engine enclosure.
Figure 4:
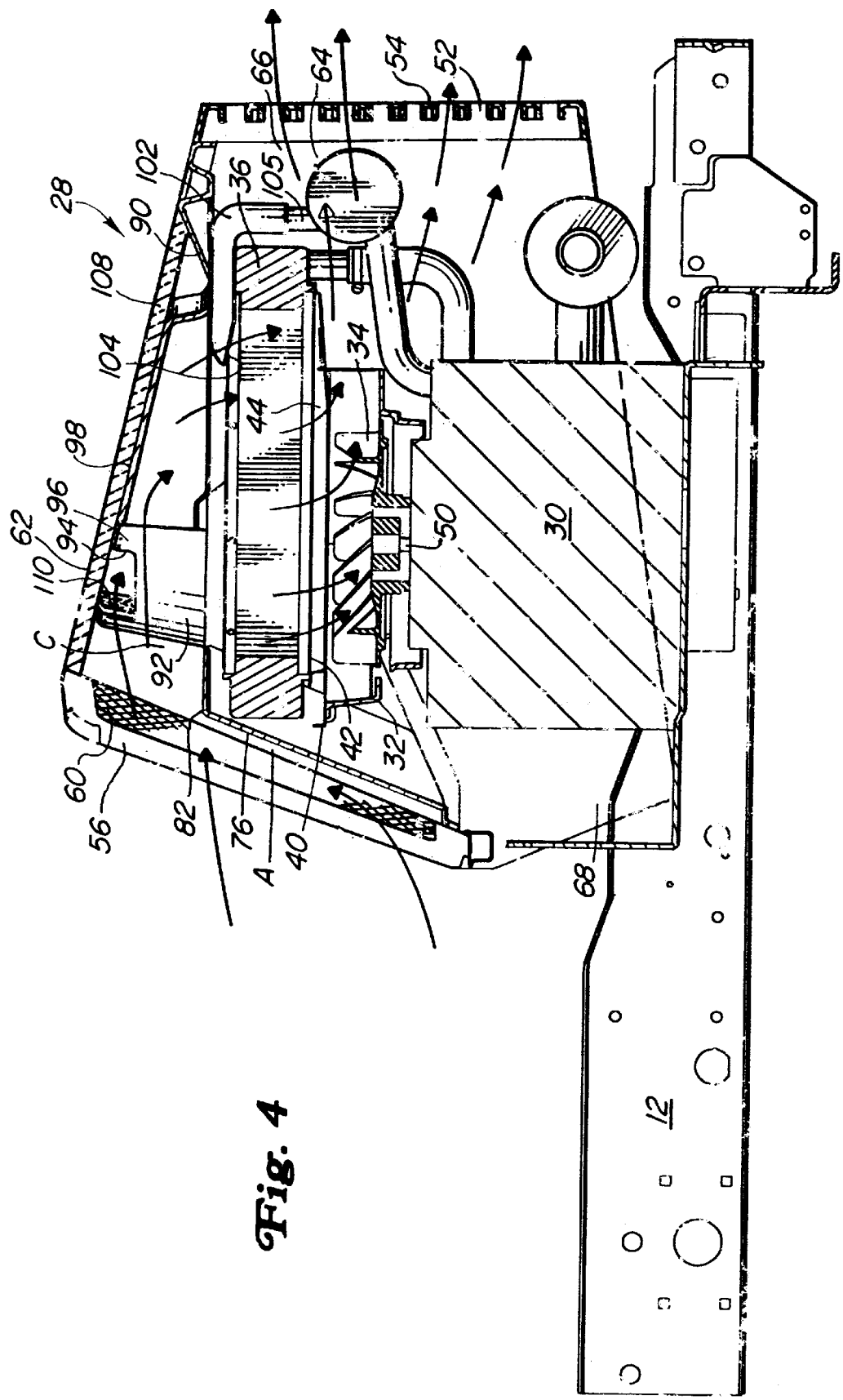
FIG. 4 is a view of the engine enclosure taken along lines 4—4 of FIG. 3, with arrows depicting the air flow.

Looking now to the exploded view of FIG. 2, there is illustrated the essential components housed within the engine compartment. They include the engine 30 supported on the frame 12, a fan shroud 32 within which a fan 34 is rotatably housed, a radiator 36, radiator support posts 38, radiator mounting plate 40, support pan 42 and rails 44, a baffle 46 and hood 48. As shown in FIGS. 2, 3 and 4, the engine 30 is mounted on the frame 12 with the fan 34 being driven by an engine shaft 50. The fan 34 is housed within the fan shroud 32 which is also mounted on the engine 30. Carried above the fan 34 is the radiator 36 which is supported on the plate 40 and pan 42, which are in turn mounted to the radiator support posts 38. The posts 38 are mounted on the frame 12 to support the radiator 36 separate from the engine 30 and reduce the vibrations transferred to the radiator mountings. The rails 44 secure the radiator 36 to the pan 42 and plate 40. The radiator 36 is mounted horizontally above the engine 30 with the fan 34 being placed between it and the engine 30 to draw air through the radiator 36. The shroud 32 then directs the used air rearwardly and through an outlet opening 52 in a grill 54 at the rear of the hood 48, see FIG. 4.

Figure 5:
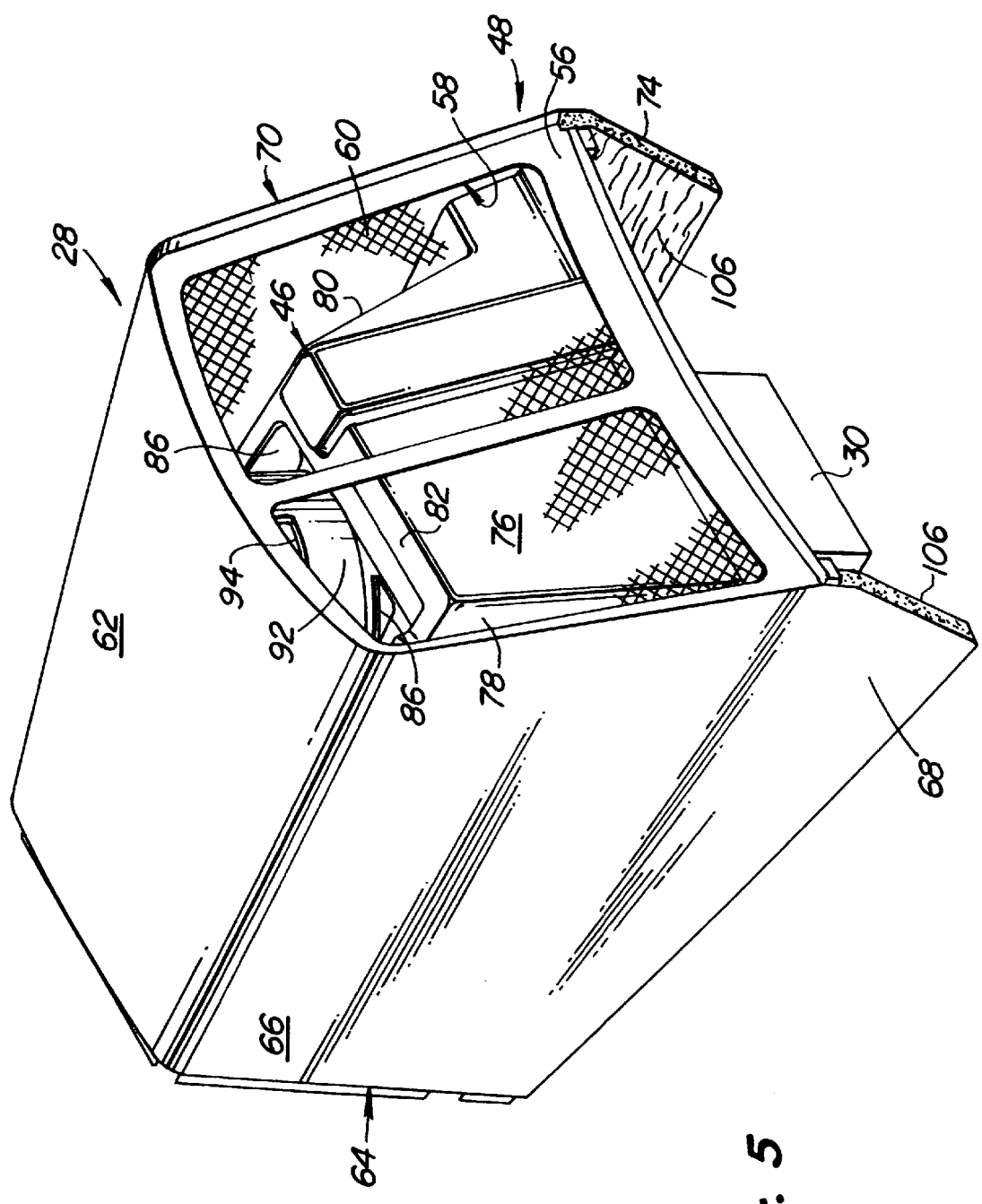
FIG. 5 is an elevated perspective view of the engine enclosure.

Looking as well to FIG. 5, it will be seen that the engine enclosure 28, which is comprised of the hood 48 and baffle 46, covers the top, sides, front and rear of the engine compartment. The hood 48, best illustrated in FIGS. 2, 3, 5 and 8, is comprised of a front member 56 with an inlet opening 58 covered by a screen 60, a top member 62, a left side member 64 having respective rearwardly and downwardly extending portions 66–68, a right side member 70 with similar rearwardly and downwardly extending portions 72–74, and the rear member 54 which in the preferred embodiment takes the form of a grill through which used cooling air is exhausted.

Figure 6:
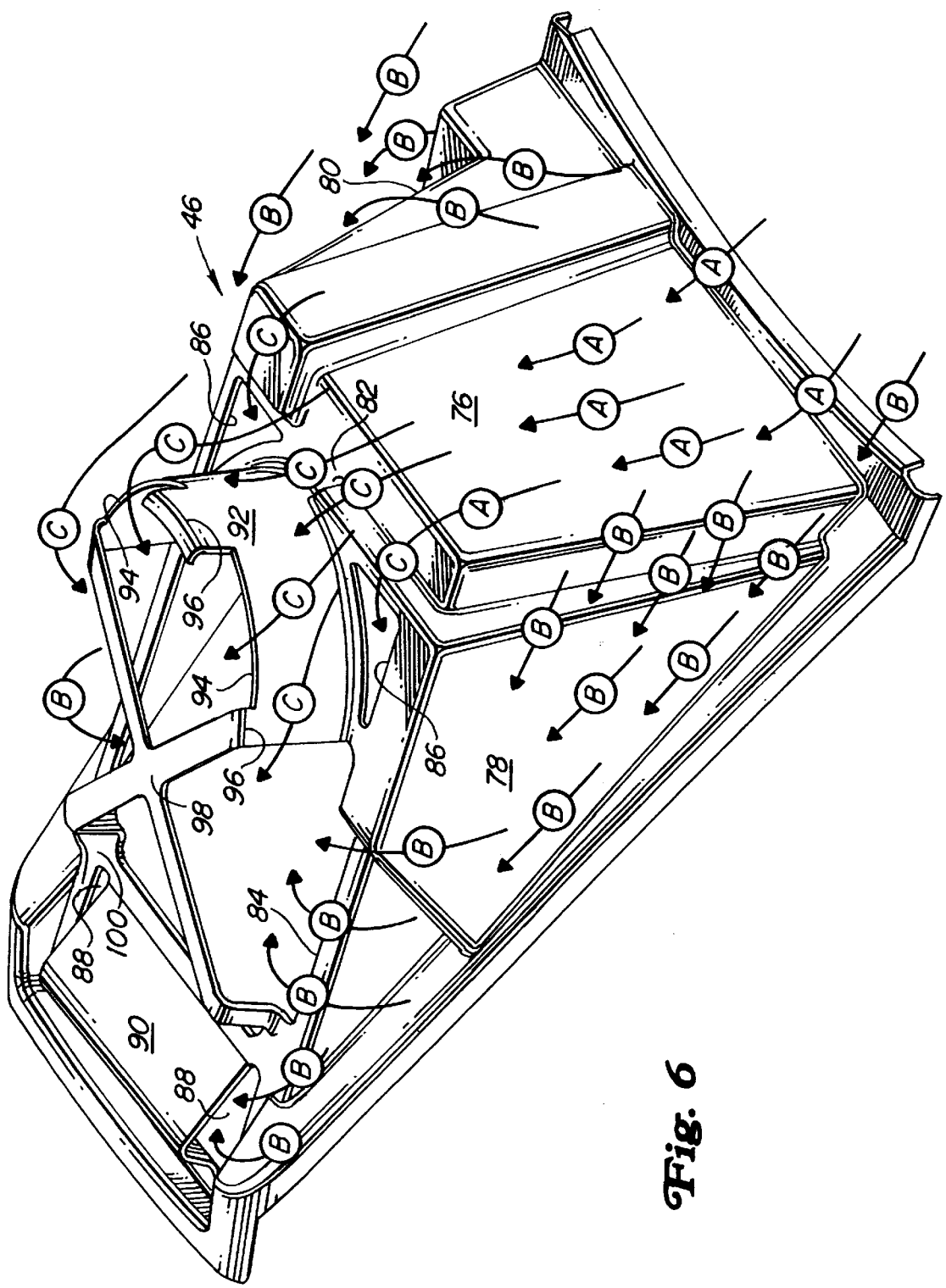
FIG. 6 is an elevated front perspective view of the baffle, with the air flow patterns depicted by the letters A, B and C.
Figure 8:
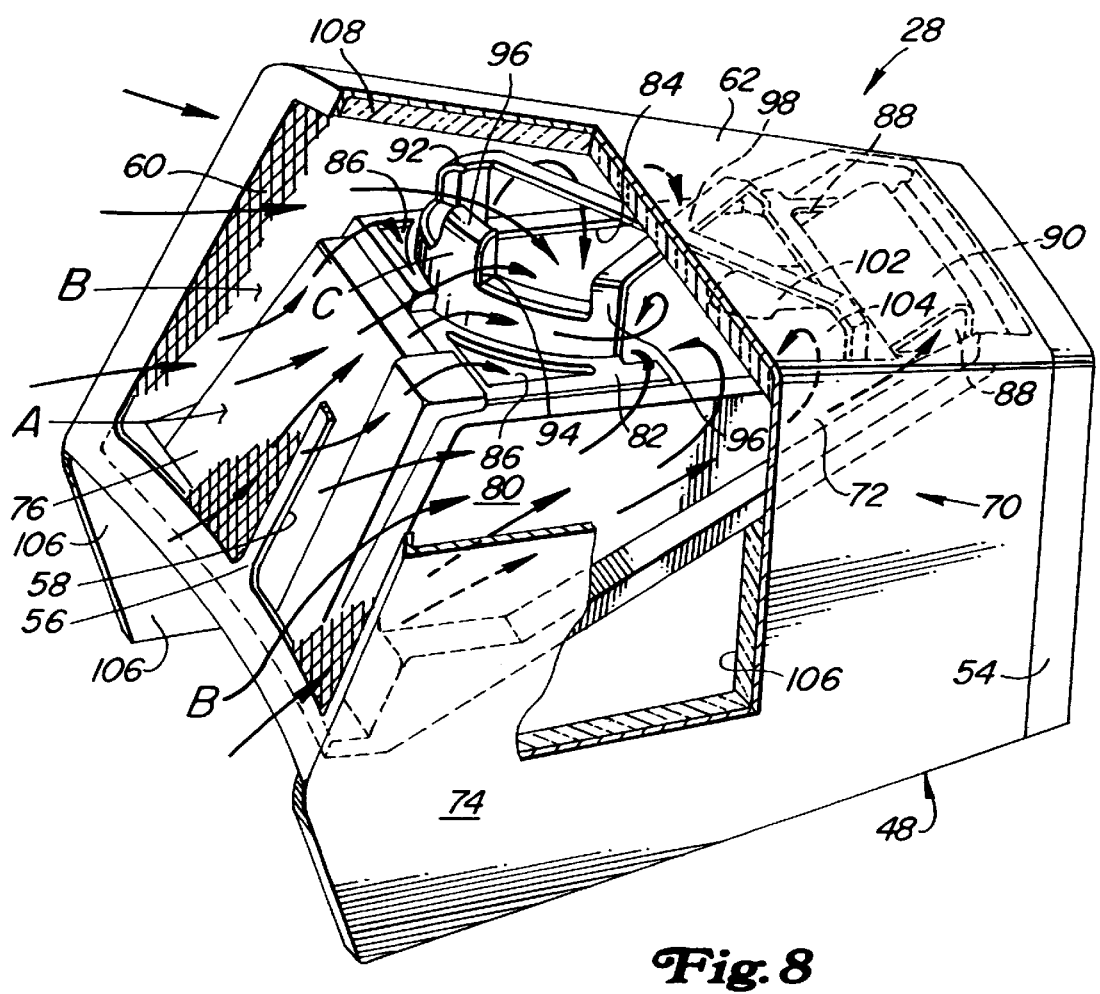
FIG. 8 is a right front elevated perspective view of the engine enclosure with portions of the hood removed to illustrate the structure of the baffle and the air flow patterns.

The baffle 46, which is best shown in FIGS. 2 and 6, similarly includes a front surface 76, left and right surfaces 78–80 and a top surface 82. A large central outlet opening 84 and smaller front and rear side openings 86–88 in the top surface 82 provide for the flow of air to the top surface of the radiator 36 housed beneath the baffle 46. At the rear of the top surface 82 of the baffle 46 is provided a downwardly and rearwardly sloping surface 90 that abuts the top member 62 of the hood 48 and serves as a rear air deflector, see FIG. 4. At the forward edge of the central opening 84 is carried an upstanding curved wall surface or deflection surface 92 with notched openings 94 at each side. The center and side portions 96 of this air deflecting wall 92 extend to the underside of the top member 62, see FIGS. 3 and 4. As shown in FIGS. 6 and 8, structure 98 taking the form of an "X" is attached to and extends between the side portions 96 of the wall 92 and rear portion 100 of the top surface 82 to support the top member 62 of the hood 48.

As shown in FIG. 4, the hood 48 and baffle 46 provide a modular enclosure which directs air from the inlet opening 58 at the forward end of the engine compartment to the radiator 36 and exhausts it out the outlet opening 52 in the back of the enclosure 28. The air flow as well as its direction of movement is depicted by arrows in FIGS. 4, 6 and 8. To direct the air to the radiator 36 and exhaust it, the enclosure 28 includes, first, second and third air stream paths or passages, which are formed between the spaced apart members of the hood 48 and surfaces of the baffle 46. The air flow patterns within each of these passages are designated by the letters A, B and C respectively in FIGS. 4, 7 and 8. Passage A is formed between the front member 56 and the screened-in front surface 76, the two passages designated B are formed between the pairs of side members and surfaces 64–78 and 70–80, and passage C is formed between the top member 62 and top surface 82.

Looking again to FIG. 4, there is illustrated an air cleaner inlet tube 102 at the rear of the outlet opening 84 in the top surface 82. This tube 102 takes the form of a snorkel and draws air from the rear central portion of the outlet opening 84 to supply the engine air cleaner intake line 105. The tube 102 is provided with its inlet opening 104 at the underside of its forward end to draw cool air from the air supplied by all three passages A, B and C.

Additionally provided on the downwardly extending portions 68–74 of the side members 64–70 of the hood 48 is a foam sound absorbing material 106. Similar foam material 108 is also provided on the underside of the top member 62 of the hood 48 and the rear side of the upstanding wall 92 is also provided with foam 110. This sound absorbing material 106, 108 and 110 is added to assist in containing the emission of noise generated by the engine 30 and can be particularly useful when utilized in a vehicle 10 having a diesel engine. Through adding it on the top member 62 and upstanding wall 92, many of the engine sound waves which pass out the central opening 84 are absorbed before they can escape through the screen 60. Further assisting in containing the emission of sound from the front, side and top of the engine compartment are the acoustic air barriers provided by the double walled air passages between the hood 48 and baffle 46. The hood 48 and baffle 46 of the preferred embodiment additionally assist in containing the engine sounds since they are comprised of a plastic or composite material.

The vehicle 10 would typically be used with a mower deck supported at its forward end to cut grass and similar vegetation. During the cutting of such grass and vegetation, dust, grass clippings and similar debris would be thrown into the air surrounding the vehicle 10 due to the operation of the cutting blades. Through providing the screened inlet opening 58 for the cooling air rearward of the operator station 18, and at a somewhat elevated level, the amount of air with contaminants entering the inlet opening 58 is reduced. With the inlet opening 58 oriented generally vertically, rain, leaves and similar debris are prevented from entering.

Figure 7:
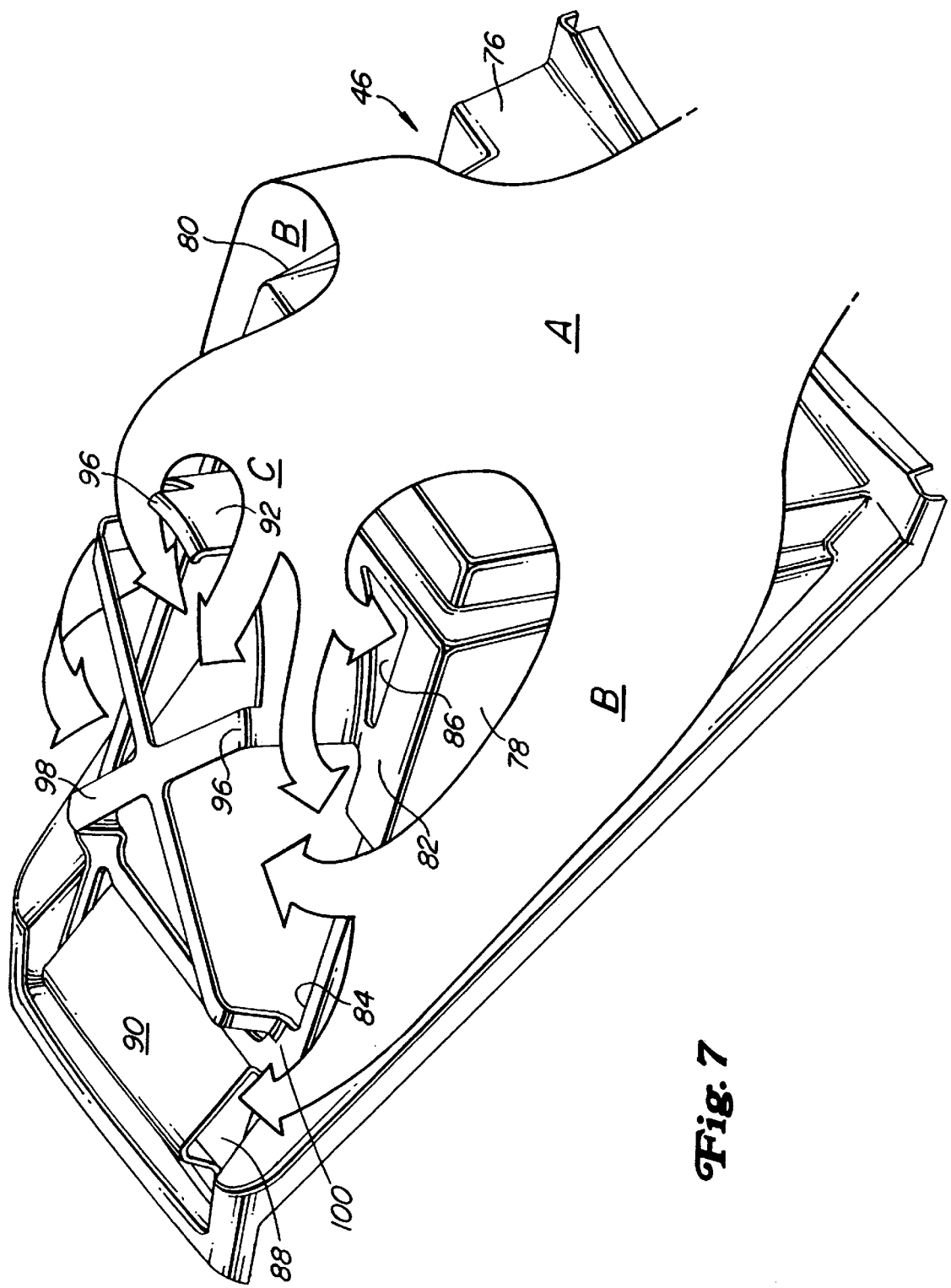
FIG. 7 is another view of the baffle, illustrating the air flow patterns A, B and C found respectively in the first, second and third air passages.

During operation, air drawn by the fan 34 will enter the screened inlet opening 58 and flow in streams along passages A, B and C as illustrated in FIGS. 6 and 7. The hood 48 has been removed from these views to better illustrate the air flow patterns and passages found between the members of the hood and surfaces of the baffle. Initially, the air will enter the first stream or passage A between the front member 56 of the hood 48 and the front surface 76 of the baffle 46. As illustrated in FIGS. 6, 7 and 8, part of the air entering through the screen 60 will also be drawn to each side and into the two second passages B between the left side member 64 and left side surface 78 and the right side member 70 and the right side surface 80. In the preferred embodiment, these side surfaces 78–80 are triangularly shaped, but could take other shapes that include triangularly shaped portions therein. Yet another part of the air will be drawn upwardly and over the top of the front surface 76 to pass through the third passage C between the top surface 82 and the top member 62.

As the air moves along the two passages B, most of it will be drawn through the central outlet 84 opening provided in the top surface 82 while some of it will enter the rear side inlets 88. As air moves through the third passage C, some of it will be drawn into the front side outlets 86, some will be deflected around the upstanding wall 92 and into the central opening 84, some will pass over the notched openings 94 of the wall 92 and into the central opening 84 and some will flow to the side openings 88 at the rear of the baffle 46. In this way, air is provided to the top surface of the radiator 36 at its front, central and rear portions to be drawn through it and cool it evenly. After passing through the radiator 36, the fan 34 exhausts the air generally horizontally through the grill member 54 of the hood 48.

The enclosure further serves to contain noise generated by the engine and isolate it from the operator, as well as those who would be adjacent the operation of the vehicle. This is accomplished not only through placing the sound absorbing material along the lower portions of the respective left and right side members, the underside of the top member of the hood and the rear surface of the upstanding wall 92, but also through the use of the double walled air passages with space between them that serve as sound insulators.

With the present invention, there is provided an engine enclosure that utilizes their respective spaced apart surfaces to provide passages for directing air to the radiator. The passages further serve, along with sound absorbing foam, to contain engine sounds within the enclosure. The modular construction of the enclosure allows the enclosure to be raised or removed to allow service and maintenance to the engine and its components.

What is claimed is:

1. An engine enclosure comprised of a hood having a baffle secured thereto to provide air passages between the hood and baffle the hood having adjoining front, left and right side and top members, the front member including an inlet opening therein, the baffle operatively being attached to the inside of the hood and including adjoining front, left and right side and top surfaces, said side surfaces including a generally triangularly shaped portion therein, each of which surfaces are in closely spaced relationship with the respective front, left and right side and top members of the hood to form first, second and third air passages therewith, said first passage being formed between the front member and front surface, said second passage being formed between one side member and side surface and the third passage being formed between the top member and top surface, and the top surface includes an air outlet opening through which air received from the inlet opening of the front member and moved along the first, second and third passages can be exhausted.

2. The invention defined in claim 1 wherein second passages are provided between the left side member and left side surface and also between the right side member and the right side surface.

3. The invention defined in claim 1 wherein the top surface further includes front and rear outlet openings adjacent the central outlet opening.

4. The invention defined in claim 1 wherein the top surface of the baffle is provided with an upstanding wall surface adjacent the outlet opening in the baffle.

5. The invention defined in claim 4 wherein the wall surface is provided with a notched area through which air can pass.

6. The invention defined in claim 4 wherein the wall surface has sound absorbing material attached thereto.

7. The invention defined in claim 4 wherein the top surface carries structure for supporting the top member of the hood.

8. The invention defined in claim 7 wherein the support structure is connected with the wall surface.

9. The invention defined in claim 1 wherein portions of the top member, left side and right side members of the hood have sound absorbing material attached thereto.

10. The invention defined in claim 9 wherein sound absorbing material is provided on the top member above the outlet opening of the top surface.

11. The invention defined in claim 1 wherein the air passages serve as acoustic barriers to contain noise within the engine compartment.

12. The invention defined in claim 1 wherein the front member of the hood extends generally vertically and is adjacent the operator station.

13. The invention defined in claim 1 wherein the air inlet opening in the front member is provided with a screen.

14. The invention defined in claim 1 wherein the hood includes a rear member which includes an air outlet opening through which air can be exhausted.

15. An engine enclosure comprising a hood having a baffle operatively coupled therewith to provide air passages between the hood and baffle, the hood including a top member, a front member with an inlet opening therein, left and right side members attached to the top and front members and extending back from the front member, the baffle operatively mounted within the hood to form therewith passages for receiving air from the inlet opening in the front member, said baffle having a first generally upright surface in closely spaced relationship with the front member and the inlet opening of the hood to provide a first air passage between the front member and the upright surface, left and right side surfaces extending laterally from the upright surface of the baffle, said side surfaces including a generally triangularly shaped portion therein and being in closely spaced relationship with the respective left and right members of the hood to provide second air passages between said side members and side surfaces, and a top surface coupled with the upright, left and right side surfaces of the baffle and extending laterally to form a third air passage with the top member, said top surface including a vertical opening therein for permitting air which has been received from the inlet opening of the hood and moved along the first, second and third air passages to pass therethrough.

16. The invention defined in claim 15 wherein the top surface further includes front and rear outlet openings adjacent the central outlet opening.

17. The invention defined in claim 15 wherein a generally upright wall surface is operatively connected to the top surface of the baffle at the edge of the outlet opening in the top surface.

18. The invention defined in claim 17 wherein the vertical opening in the top surface of the baffle includes an edge adjacent the outlet opening and the upstanding wall surface is adjacent said edge.

19. The invention defined in claim 17 wherein the hood includes a rear member with an outlet opening through which the fan exhausts air which has been moved through the radiator.

20. An engine enclosure comprising a hood having a baffle operatively secured therein to form air passages between the hood and baffle, the hood including a top member, upstanding front and rear members, the front member having an inlet opening therein and the rear member having an outlet opening therein, left and right side members attached to the top and front members and extending back from the front member, the baffle and hood forming passages for directing air received from the inlet opening in the front member to and through the outlet opening in the rear member, said baffle having a first generally upright surface in closely spaced relationship with the front member and the inlet opening of the hood to provide a first air passage between the front member and the upright surface, left and right side surfaces extending laterally from the upright surface of the baffle, said side surfaces including a generally triangularly shaped portion therein and being in closely spaced relationship with the respective left and right members of the hood to provide second air passages between said side members and side surfaces, and a top surface coupled with the upright, left and right side surfaces of the baffle and extending laterally to form a third air passage with the top member, said top surface including a vertical opening therein for permitting air received from the air inlet in the front member to pass along the first, second and third air passages to and through the vertical opening in the top surface and the outlet opening in the rear member.

21. The invention defined in claim 20 wherein the top surface further includes front and rear outlet openings adjacent the central outlet opening.

22. An improved engine enclosure comprised of a hood and baffle removably joined together to provide air passages between the hood and baffle, the hood including a top member, upstanding front and rear members, the front member having a screened inlet opening therein and the rear member having an outlet opening therein, left and right side members attached to the top and front members, said side members each having portions extending rearwardly and downwardly from the front member, the baffle operatively connected with the hood to form therewith passages for directing air received from the inlet opening in the front member, said baffle having a first generally upright surface in closely spaced relationship with the front member and the inlet opening of the hood to provide a first air passage between the front member and the upright surface, left and right side surfaces extending laterally from the upright surface of the baffle, said side surfaces including a generally triangularly shaped portion therein and being in closely spaced relationship with the rearwardly extending portions of the respective left and right members of the hood to provide second air passages between said portions of the side members and the left and right side surfaces, a top surface coupled with the upright, left and right side surfaces of the baffle and extending laterally to form a third air passage with the top member, said top surface including a vertical opening therein for permitting air which has been received from the air inlet in the front member, along the first, second and third air passages to pass through the vertical opening and the outlet opening in the rear member, and the downwardly extending portions of the left and right side members are provided with sound absorbing material.

23. The invention defined in claim 22 wherein the top surface further includes front and rear outlet openings adjacent the central outlet opening.

24. The invention defined in claim 23 wherein at least part of the top member above the outlet opening of the top surface is provided with sound absorbing material.

25. The invention defined in claim 23 wherein the air passages further serve as acoustic air barriers that contain noise.

26. An engine enclosure comprised of a hood with adjoining front, side and top members, the front member including an inlet opening therein, a baffle attached to the inside of the hood and including adjoining front, side and top surfaces, said side surface including a generally triangularly shaped portion therein, each of which surfaces are in closely spaced relationship with the respective front, left and right side and top members of the hood, said baffle and hood being in registry with one another to form an air passage therebetween, said passage being formed between the front member and front surface, the top member and top surface and the respective side members and side surfaces, and the top surface includes an air outlet opening through which air received through the inlet opening of the front member can be moved along the air passage and to and through the outlet opening in the top surface.

27. The invention defined in claim 26 wherein the air passage further serves as an acoustic air carrier that contains noise.

28. The invention defined in claim 26 wherein the top surface further includes front and rear outlet openings adjacent the central outlet opening.

29. The invention defined in claim 26 wherein portions of the top member, left side and right side members of the hood have sound absorbing material attached thereto.

30. The invention defined in claim 26 wherein sound absorbing material is provided on the top member above the outlet opening of the top surface.

31. The invention defined in claim 26 wherein the top surface of the baffle is provided with an upstanding wall surface adjacent the outlet opening in the baffle.

* * * * *

UNITED STATES PATENT AND TRADEMARK OFFICE
CERTIFICATE OF CORRECTION

PATENT NO. : 6,167,976 B1
DATED : January 2, 2001
INVENTOR(S) : Michael Jerome O'Neill et al.

It is certified that error appears in the above-identified patent and that said Letters Patent is hereby corrected as shown below:

Column 7,
Line 9, delete "central outlet" and insert -- vertical --.

Column 8,
Line 3, delete "central outlet" and insert -- vertical --.
Line 29, delete "carrier" and insert -- barrier --.
Line 33, delete "central".

Signed and Sealed this

Twentieth Day of May, 2003

JAMES E. ROGAN
*Director of the United States Patent and Trademark Office*